US006989949B2

(12) United States Patent
Cheng et al.

(10) Patent No.: US 6,989,949 B2
(45) Date of Patent: Jan. 24, 2006

(54) PERFORMANCE TEST METHOD OF HEAD GIMGAL ASSEMBLY WITH PRECISE POSITIONING ACTUATOR

(75) Inventors: Tsz Lok Cheng, Kwai Chung (HK); Tamon Kasajima, Kwai Chung (HK); Masashi Shiraishi, Kwai Chung (HK); Katsuhiko Tomita, Tokyo (JP); Takashi Honda, Tokyo (JP); Takeshi Wada, Tokyo (JP)

(73) Assignees: SAE Magnetics (H.K.) Ltd., Kwai Chung (HK); TDK Corporation, Tokyo (JP)

( * ) Notice: Subject to any disclaimer, the term of this patent is extended or adjusted under 35 U.S.C. 154(b) by 199 days.

(21) Appl. No.: 10/346,056

(22) Filed: Jan. 17, 2003

(65) Prior Publication Data

US 2003/0103284 A1 Jun. 5, 2003

Related U.S. Application Data

(63) Continuation-in-part of application No. 09/950,055, filed on Sep. 12, 2001, now Pat. No. 6,801,377.

(30) Foreign Application Priority Data

Sep. 13, 2000 (JP) ....................................... 2000-277923
Jan. 21, 2002 (JP) ....................................... 2002-011555

(51) Int. Cl.
*G11B 27/36* (2006.01)

(52) U.S. Cl. ........................ 360/31; 360/76; 360/77.02; 360/77.04; 360/77.06; 360/78.05; 324/210; 324/212

(58) Field of Classification Search .................. 360/31, 360/77.02, 77.04, 77.06–77.07, 66, 57, 78.04, 360/76, 55, 78.05, 75, 53; 324/210, 212
See application file for complete search history.

(56) References Cited

U.S. PATENT DOCUMENTS

| | | | | | |
|---|---|---|---|---|---|
| 5,745,319 | A | * | 4/1998 | Takekado et al. | 360/78.05 |
| 5,998,994 | A | * | 12/1999 | Mori | 360/75 |
| 6,061,201 | A | * | 5/2000 | Woods | 360/77.06 |
| 6,292,317 | B1 | * | 9/2001 | Alexander | 360/31 |
| 6,512,647 | B1 | * | 1/2003 | Quak et al. | 360/66 |

FOREIGN PATENT DOCUMENTS

| | | | |
|---|---|---|---|
| JP | 8-180623 | | 7/1996 |
| JP | 2001-118256 | * | 4/2001 |

* cited by examiner

*Primary Examiner*—David Hudspeth
*Assistant Examiner*—Natalia Figueroa

(57) ABSTRACT

A method of testing a performance of the HGA has a step of writing information from the at least one thin-film magnetic head element onto a magnetic disk with driving the actuator for displacement by applying an alternating drive signal to the actuator, a step of reading out the information of at least one rotation of the magnetic disk by the at least one thin-film magnetic head element without driving the actuator for displacement, a step of storing the information read-out from the magnetic disk as a read-out information along a disk-rotating direction, a step of moving the HGA toward an off-track direction by a predetermined distance, a step of repeatedly executing the reading, storing and moving steps to obtain two-dimensional read-out information along the disk-rotating direction and the off-track direction, and a step of determining, from the two-dimensional read-out information, an off-track position where the read-out information becomes maximum at each position along the disk-rotating direction, the determined off-track positions being recognized as displaced positions of the actuator in response to the applied alternating drive signal.

10 Claims, 14 Drawing Sheets

Fig. 11

| | $x_1$ | $x_2$ | $x_3$ | • • • | $x_m$ | • • • | $x_M$ |
|---|---|---|---|---|---|---|---|
| $y_1$ | $amp(x_1, y_1)$ | $amp(x_2, y_1)$ | $amp(x_3, y_1)$ | • • • | $amp(x_m, y_1)$ | • • • | $amp(x_M, y_1)$ |
| $y_2$ | $amp(x_1, y_2)$ | $amp(x_2, y_2)$ | $amp(x_3, y_2)$ | • • • | $amp(x_m, y_2)$ | • • • | $amp(x_M, y_2)$ |
| $y_3$ | $amp(x_1, y_3)$ | $amp(x_2, y_3)$ | $amp(x_3, y_3)$ | • • • | $amp(x_m, y_3)$ | • • • | $amp(x_M, y_3)$ |
| ⋮ | • • • | • • • | • • • | • • • | • • • | • • • | • • • |
| $y_n$ | $amp(x_1, y_n)$ | $amp(x_2, y_n)$ | $amp(x_3, y_n)$ | • • • | $amp(x_m, y_n)$ | • • • | $amp(x_M, y_n)$ |
| ⋮ | • • • | • • • | • • • | • • • | • • • | • • • | • • • |
| $y_N$ | $amp(x_1, y_N)$ | $amp(x_2, y_N)$ | $amp(x_3, y_N)$ | • • • | $amp(x_m, y_N)$ | • • • | $amp(x_M, y_N)$ |

PERFORMANCE TEST METHOD OF HEAD GIMGAL ASSEMBLY WITH PRECISE POSITIONING ACTUATOR

CROSS-REFERENCE TO RELATED APPLICATION

This application is a continuation-in-part application of U.S. application Ser. No. 09/950,055, filed on Sep. 12, 2001, now U.S. Pat. No. 6,801,377.

FIELD OF THE INVENTION

The present invention relates to a method for testing a performance of a head gimbal assembly (HGA) with a precise positioning actuator for a thin-film magnetic head element used in a magnetic disk drive unit, particularly to a method for testing a displacement performance of the actuator.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be achieved by the VCM only. The techniques for achieving precise positioning of the magnetic head are described in for example U.S. Pat. No. 5,745,319 and Japanese patent publication No. 08180623 A.

As for such precise positioning actuator, there is a piggy-back structure actuator using a piezoelectric material. This piggy-back structure actuator is formed by piezoelectric material member of PZT in an I-character shape with one end section to be fixed to a suspension, the other end section to be fixed to a magnetic head slider and a pillar shaped movable arms connected between these end sections. By applying voltage across electrode layers sandwiching the piezoelectric material member, the actuator will displace to precisely position the thin-film magnetic head element.

In order to test a displacement performance of this precise positioning actuator, a displaced amount has been conventionally measured by using a laser Doppler vibration meter. Namely, when the actuator is driven, a laser beam is irradiated to the displaced section of the actuator and then the displaced amount is measured. By this test method of the displacement performance, a displaced amount and a response speed of the actuator in response to an applied drive signal can be accurately measured.

However, during manufacturing and testing processes of an HGA, such displacement measurement using a laser Doppler vibration meter will arise following various problems:

(1) Because of the laser Doppler vibration meter itself is expensive, a manufacturing cost of the HGA increases;

(2) Since the measurement using the laser Doppler vibration meter needs a long time, the inspection time becomes huge causing the manufacturing cost also to increase;

(3) Introduction of the laser Doppler vibration meter which is alien to the ordinal inspection instruments for testing the magnetic head element will complicate the inspection process and also increase the number of the inspection process; and (4) Introduction of the laser Doppler vibration meter increases a footprint of the inspection instruments.

SUMMARY OF THE INVENTION

It is therefore an object of the present invention to provide a performance test method of an HGA with a precise positioning actuator, whereby a displacement performance of the actuator can be easily obtained in a short time without increasing a manufacturing cost of the HGA.

Another object of the present invention is to provide a performance test method of an HGA with a precise positioning actuator, whereby a displacement performance of the actuator can be more precisely obtained.

An HGA includes a magnetic head slider with at least one thin-film magnetic head element, a support and an actuator for displacing the magnetic head slider with respect to the support so as to precisely position the at least one thin-film magnetic head element. According to the present invention, a method of testing a performance of the HGA has a step of writing information from the at least one thin-film magnetic head element onto a magnetic disk with driving the actuator for displacement by applying an alternating drive signal to the actuator, a step of reading out the information of at least one rotation of the magnetic disk by the at least one thin-film magnetic head element without driving the actuator for displacement, a step of storing the information read-out from the magnetic disk as a read-out information along a disk-rotating direction, a step of moving the HGA toward an off-track direction by a predetermined distance, a step of repeatedly executing the reading, storing and moving steps to obtain two-dimensional read-out information along the disk-rotating direction and the off-track direction, and a step of determining, from the two-dimensional read-out information, an off-track position where the read-out information becomes maximum at each position along the disk-rotating direction, the determined off-track positions being recognized as displaced positions of the actuator in response to the applied alternating drive signal.

Write operation to the magnetic disk is executed under driving of the actuator for displacement by applying alternating drive signal to the actuator, and then read-out operation from the magnetic disk is executed without driving the actuator for displacement. The read-out information is stored. These operations are repeatedly performed by moving the HGA using a dynamic performance (DP) tester or a read/write (R/W) tester for one step of a predetermined distance, and then two-dimensional read-out information along the disk-rotating direction and the off-track direction are obtained. An off-track position where the read-out information becomes maximum at each position along the disk-rotating direction is calculated from the two-dimensional read-out information. Thus obtained off-track positions are recognized as displaced positions of the actuator in response to instantaneous values of the applied alternating drive signal.

Therefore, it is not necessary to introduce a new inspection instrument resulting a manufacturing cost of the HGA to prevent from increasing. Also, since the displacement performance test can be executed simultaneously with the normal test of the electromagnetic conversion performance of the HGA using a DP tester or an R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing. Particularly, according to the present invention, since an actual waveform as a function of time of how the actuator responses to the alternating drive signal applied to the actuator is obtained, various measurements and/or mathematical calculations can be performed. For example, alternating stroke characteristics, alternating stroke asymmetry characteristics and frequency response performance of the actuator can be directly measured from the actual waveform. Also, time-displacement information of the actuator can be calculated by performing a digital Fourier analysis. Furthermore, step response characteristics of the actuator can be directly obtained from the waveform by applying a rectangular waveform drive signal to the actuator during write operation.

In this specification, "without driving an actuator for displacement" is not equivalent to merely apply no drive signal to the actuator but means to control the drive signal of the actuator so that the actuator positions at its initial position. Namely, depending upon a bias voltage applied to the actuator, the actuator may displace without applying a drive signal or the actuator may not locate at its initial position when a medium valued drive signal is applied thereto.

It is preferred that the storing step includes sampling of the read-out information at a time interval, and storing of the information sampled.

It is also preferred that the alternating drive signal is a sine wave alternating signal or a rectangular wave alternating signal.

It is further preferred that the method is repeated by varying a frequency of the alternating drive signal so as to obtain frequency response characteristics of the actuator.

Further objects and advantages of the present invention will be apparent from the following description of the preferred embodiments of the invention as illustrated in the accompanying drawings.

BRIEF DESCRIPTION OF THE DRAWINGS

FIG. 11 shows a view illustrating magnitude of read-out information or output amp($x_m$, $y_n$) in two-dimensional array, stored in a memory;

DESCRIPTION OF THE PREFERRED EMBODIMENTS

Figure 1:
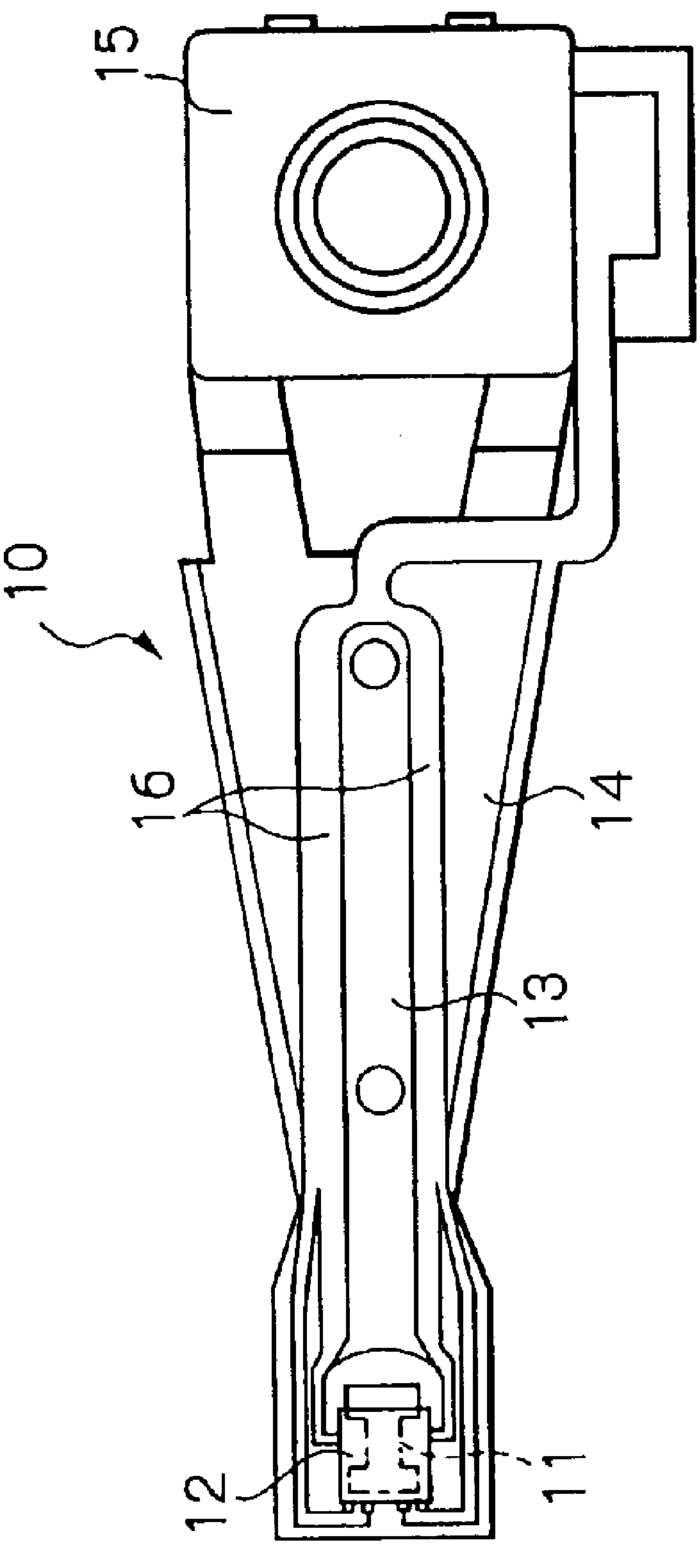
FIG. 1 shows a plane view illustrating the whole structure, seen from a magnetic head slider, of an example of an HGA to be tested its performance according to the present invention.
Figure 2:
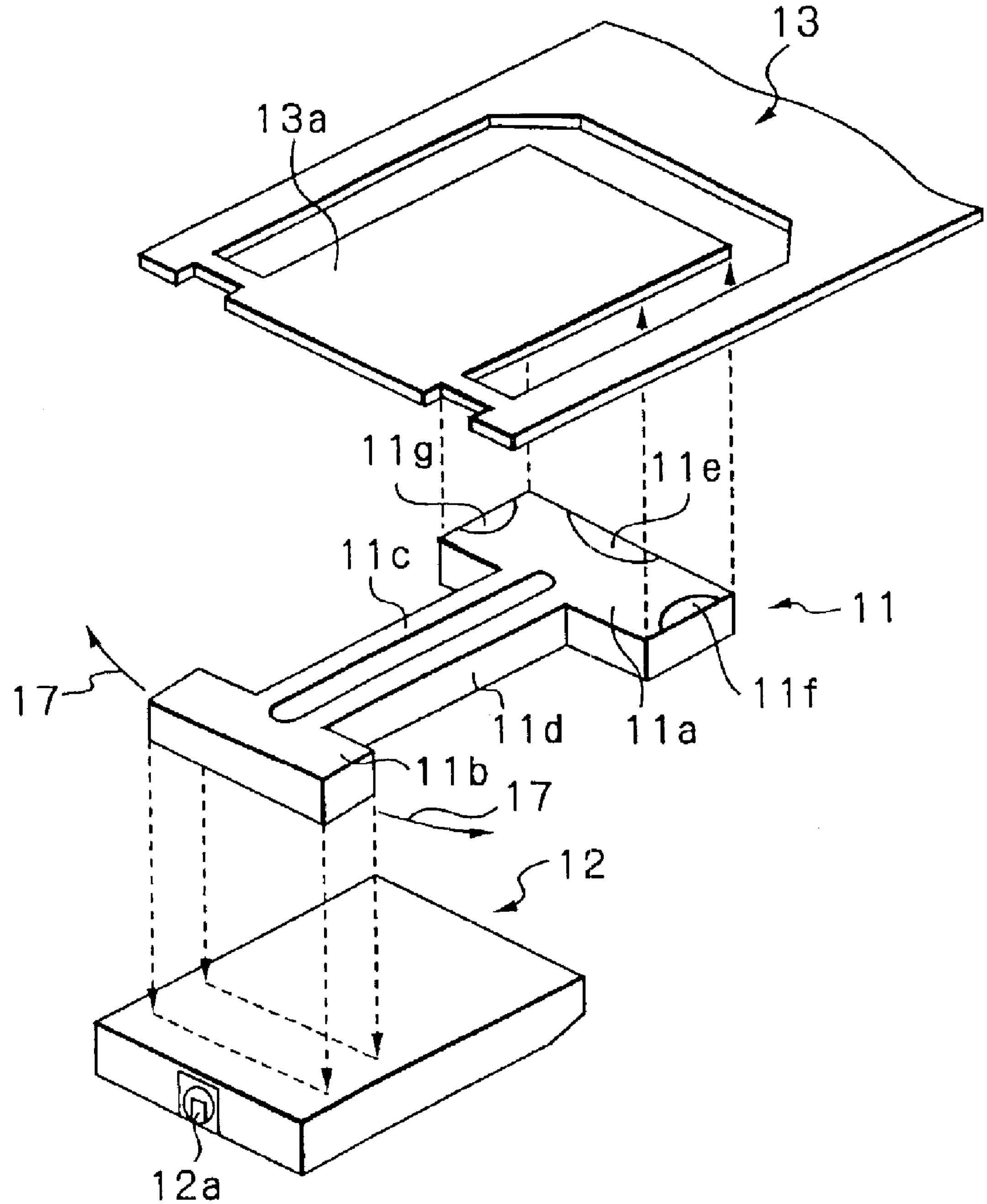
FIG. 2 shows an exploded oblique view illustrating a flexure, a precise positioning or micro actuator and the magnetic head slider located at a top end section of the HGA shown in FIG. 1.

FIG. 1 illustrates the whole structure of an example of an HGA to be tested its performance according to the present invention, and FIG. 2 schematically illustrates an attachment structure of a precise positioning actuator or micro actuator and a magnetic head slider with a top end section of a flexure of the HGA.

As shown in these figures, the HGA is assembled by fixing a fine tracking actuator 11 for precisely positioning of a thin-film magnetic head element 12*a* to a top end section of a suspension 10. The actuator 11 holds a magnetic head slider 12 with the thin-film magnetic head element 12*a*.

The suspension 10 is substantially configured by a resilient flexure 13 with a flexible tongue 13*a* formed at its top end section to carry the slider 12 through the actuator 11, a resilient load beam 14 fixed to the flexure 13, and a base plate 15 fixed to a rear end section of the load beam 14. On the flexure 13, a flexible conductor member 16 including a plurality of trace conductors of a thin-film multi-layered pattern is formed or disposed.

A main or course actuator of VCM is used for rotationally moving each drive arm to which such HGA is attached, so as to displace the whole assembly. The actuator 11 contributes fine positioning of the HGA, which cannot be adjusted by the main or course actuator.

In this embodiment, the actuator 11 is a piggy-back structure actuator. As shown in FIG. 2, the piggy-back structure actuator 11 is formed in an I character shape by uniting a one end section 11*a*, the other end section 11*b*, and two rod shaped movable beams 11*c* and 11*d* for coupling the end sections 11*a* and 11*b*. Each of the beams 11*c* and 11*d* is formed by at least one piezoelectric or electrostrictive material layer sandwiched by electrode layers. By applying voltage across the electrode layers, the piezoelectric or electrostrictive material layer expands and contracts. The piezoelectric or electrostrictive material layer is made of material that expands and contracts by reverse piezoelectric effect or by electrostrictive effect. On the end section 11*a*, formed are a common electrode terminal 11*e*, an A channel signal electrode terminal 11*f* and a B channel signal electrode terminal 11*g* connected to the electrode layers.

One ends of the movable beams 11*c* and 11*d* are united with the end section 11*a* and this section 11*a* is fixed to the flexure 13. The other ends of the movable beams 11*c* and 11*d* are united with the end section 11*b* and this section 11*b* is fixed to the slider 12. Thus, bending motion of the movable beams 11*c* and 11*d* due to their expanding and contracting generates the displacement of the section 11*b* shown by arrows 17 in the figure and therefore the displacement of the slider 12. This displacement of the slider 12 results the swing of the magnetic head element 12*a* along an arc so as to cross recording tracks of the magnetic disk surface.

It should be noted that an HGA to be tested may have a precise positioning actuator with a different structure from the aforementioned piggy-back structure.

Figure 3:
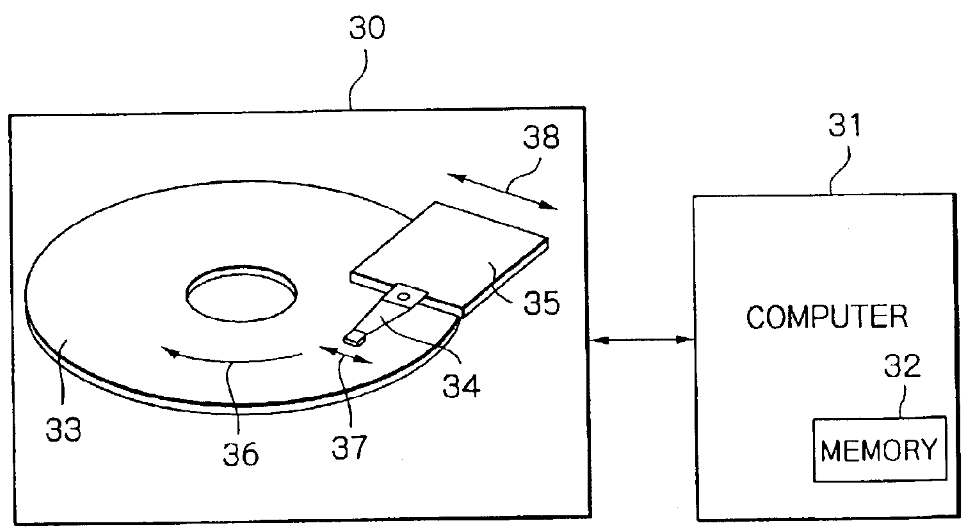
FIG. 3 shows a block diagram schematically illustrating an apparatus for testing a displacement performance of the HGA with a precise positioning actuator.

FIG. 3 schematically illustrates an apparatus for testing a displacement performance of the HGA with the precise positioning actuator.

In the figure, reference numeral 30 denotes a DP tester or a R/W tester that is usually utilized to test the electromagnetic conversion performance of the HGA, 31 denotes a computer connected to this R/W tester 30, and 32 denotes a memory arranged in the computer 31. The R/W tester 30 has a magnetic disk 33, a drive mechanism (not shown) for driving the magnetic disk 33, an HGA support 35 for supporting an HGA 34 with an actuator 11 to be tested, and a control circuit (not shown). In FIG. 3, an arrow 36 indicates rotating direction of the magnetic disk 33, an arrow 37 indicates displacing directions of the actuator 11 driven by a drive signal, and an arrow 38 indicates displacing directions of the HGA 34 driven by the R/W tester 30.

Figure 4:
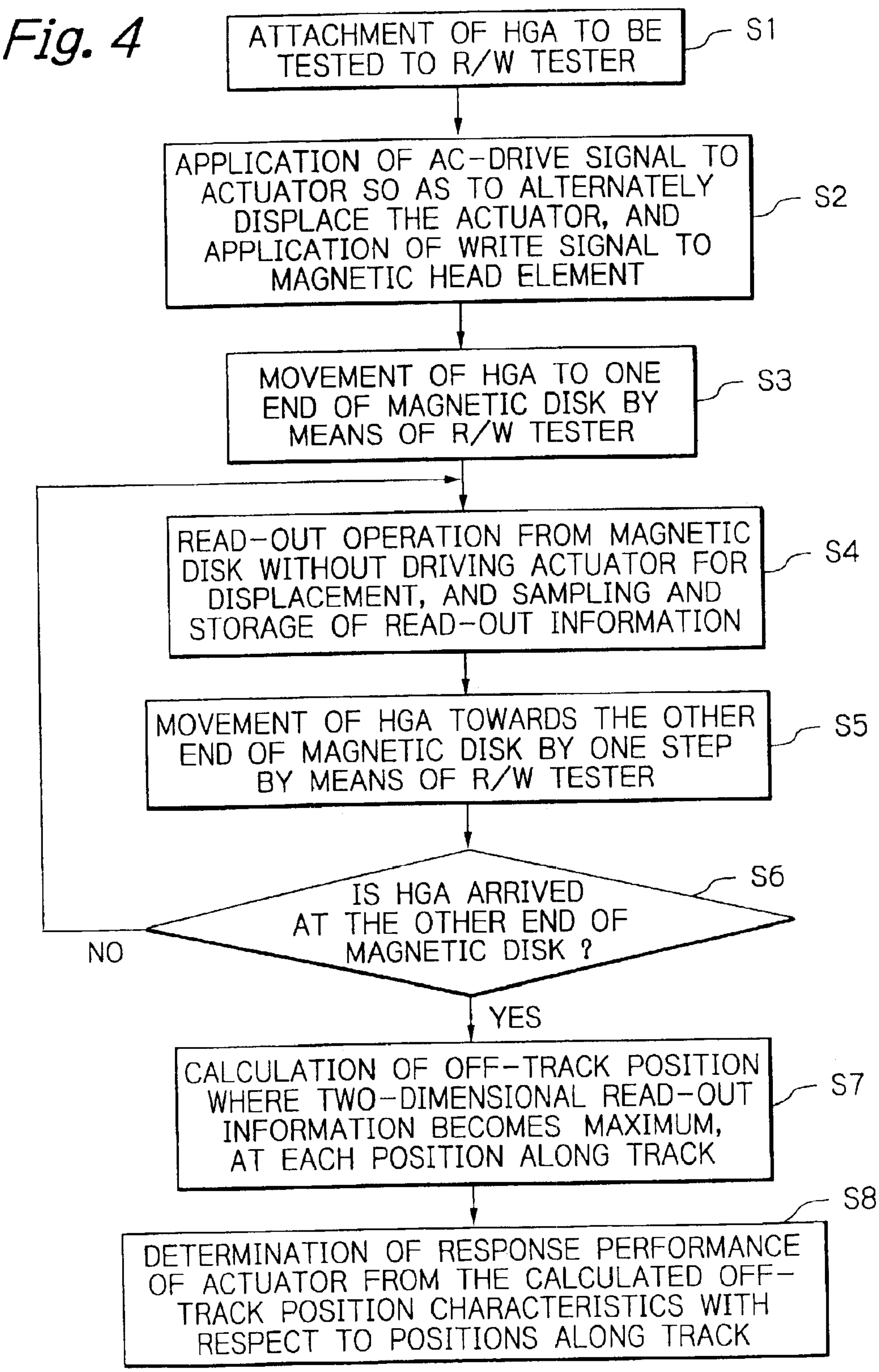
FIG. 4 shows a flow chart of an HGA performance test process in a preferred embodiment according to the present invention.

FIG. 4 shows a flow chart of an HGA performance test process in a preferred embodiment according to the present invention. Hereinafter, displacement performance testing methods according to the present inventions will be described in detail.

First, the HGA 34 to be tested is attached to the HGA support 35 of the R/W tester 30 so that the air bearing surface (ABS) of the magnetic head slider opposes to the surface of the magnetic disk 33 as shown in FIG. 3 (step S1).

Then, an alternating drive signal is applied to the actuator 11 to alternately displace this actuator, and under this state a write signal is applied to the thin-film magnetic head element 12*a* to write a single track of information on the magnetic disk 33 (step S2). More concretely, an AC drive signal of sine wave provided with an amplitude of Va/2 and biased by a DC voltage of Va/2 for example DC 7.5 V is applied across A and B channel signal electrodes of the actuator 11 to alternately displace the actuator, and write operation for one track on the magnetic disk 33 is executed under this state.

Figure 5:
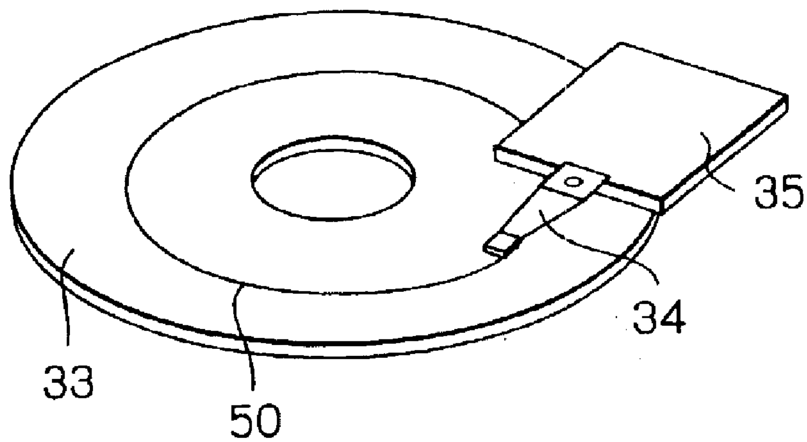
FIG. 5 shows an oblique view illustrating writing operations to a magnetic disk without driving the precise positioning actuator.
Figure 6:
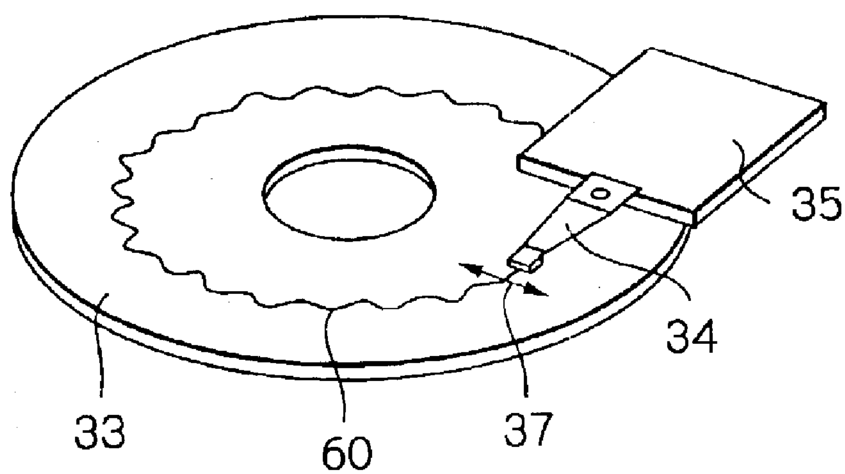
FIG. 6 shows an oblique view illustrating writing operations to a magnetic disk with driving the precise positioning actuator by an alternating voltage.

If the write operation is executed without driving the actuator 11 for displacement and without displacing the HGA 34 by the R/W tester, a circular track 50 will be recorded on the magnetic disk 33 as shown in FIG. 5. Whereas, if the write operation is executed by AC-driving the actuator 11 using alternating drive signal, a track 60 shown in FIG. 6 will be recorded on the magnetic disk 33.

Figure 7:
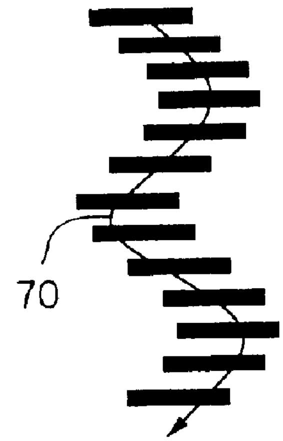
FIG. 7 shows a view illustrating displacement of a magnetic head element with respect to a magnetic disk when write operations to the magnetic disk are executed with driving the precise positioning actuator by an alternating voltage.
Figure 8:
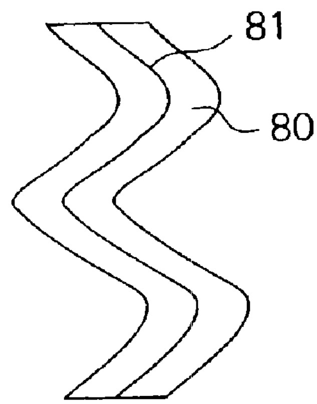
FIG. 8 shows a view illustrating a magnetic information track thus written on the magnetic disk.

According to this embodiment, the actuator 11 is AC-driven by the sine wave alternating drive signal, and thus the center of the magnetic head element during the write operation moves on the magnetic disk along a center line 70 shown in FIG. 7. Thus, a track 80 of magnetic information is formed on the magnetic disk as shown in FIG. 8. In this figure, reference numeral 81 represents a center line of the written magnetic information track.

Then, the HGA 34 is moved to one end of the magnetic disk 33 for example the center side end of recording area of the disk, by means of the R/W tester 30 (step S3).

Figure 9:
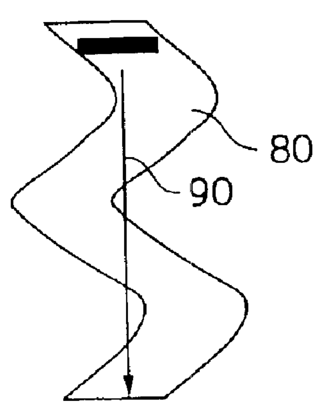
FIG. 9 shows a view illustrating the magnetic information track written on the magnetic disk and displacement of the magnetic head element during the read operation of this magnetic information from the magnetic disk.

Then, a DC drive signal of Va/2, namely a bias voltage, is applied across the A and B channel signal electrodes to locate the actuator at a center position or an initial position. With keeping this state and without driving the actuator for displacement, read operation of one track of information is executed. The read-out information of one track or the read-out information scanned along the disk-rotating direction is sampled at sampling points with a regular time interval, A/D converted and then stored in the memory 32 (step S4). FIG. 9 illustrates relationship between the magnetic information 80 written on the magnetic disk and displacement 90 of the center of the magnetic head element during the read operation without driving the actuator for displacement.

Then, the HGA 34 is moved by one step with a predetermined distance toward an off-track direction or the direction toward the other end of the magnetic disk 33 for example the circumference side end of the recording area of the disk, by means of the R/W tester 30 (step S5). The R/W tester 30 has in general a function of gradually displacing the attached HGA toward the off-track direction. At step S5, the HGA 34 is moved by one step using this function of the R/W tester.

Thereafter, whether the HGA 34 is arrived to the other end of the magnetic disk 33 for example the circumference side end of the recording area of the disk or not is judged (step S6). If it is judged not, namely the HGA 34 is not arrived to the other end, the processes at steps S4–S5 are repeatedly executed.

Figure 10:
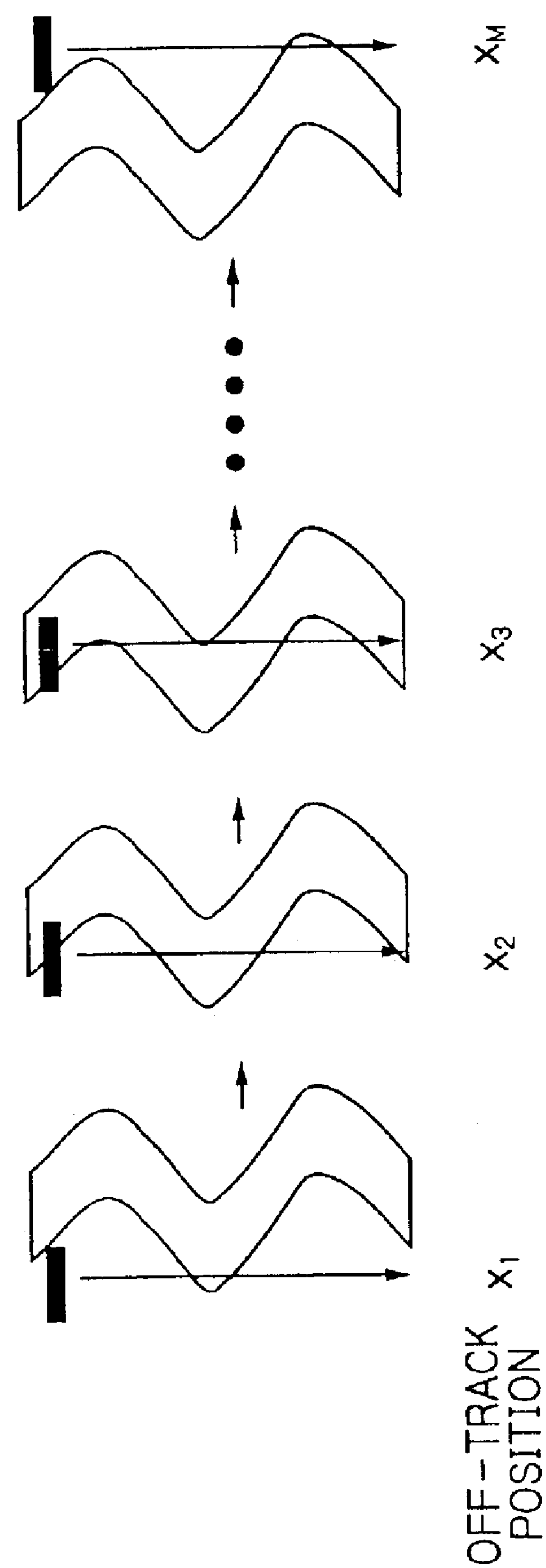
FIG. 10 shows a view illustrating read operations of the magnetic information from the magnetic disk by scanning the magnetic head along the disk rotating direction or track direction at each off-track position.

As a result, the read-out information scanned along the disk-rotating direction or along the track on the magnetic disk 33 at each of off-track positions $x_1, x_2, x_3, \ldots, x_M$ shown in FIG. 10 are sampled, A/D converted to digital information and then stored into the memory 32. Therefore, the memory 32 stores read-out information two-dimensionally scanned along the disk-rotating direction and the off-track direction.

FIG. 11 illustrates these read-out information or output $amp(x_m, y_n)$ in two-dimensional array, stored in the memory

32. In the figure, the horizontal axis corresponds to the off-track positions $x_1, x_2, x_3, \ldots, x_m, \ldots, x_M$, and the vertical axis corresponds to positions along the disk-rotating direction $y_1, y_2, y_3, \ldots, y_n, \ldots, y_N$. The latter vertical axis corresponds to sampling positions and therefore corresponds to a time delay from a reference point such as the first sampling point if the rotation speed of the magnetic disk is a constant.

If it is judged that the HGA 34 arrived to the other end of the magnetic disk 33 at step S6, it is understood that read-out information or output amp($x_m$, $y_n$) two-dimensionally scanned along the disk-rotating direction and the off-track direction are stored in the memory 32. Then, from these read-out information or output amp($x_m$, $y_n$), an off-track position D(1), D(2), D(3), . . . , D(m), . . . , D(M) where the read-out information becomes maximum is calculated at each of positions $y_1, y_2, y_3, \ldots, y_n, \ldots, y_N$ along the disk-rotating direction (step S7).

Figure 12A:
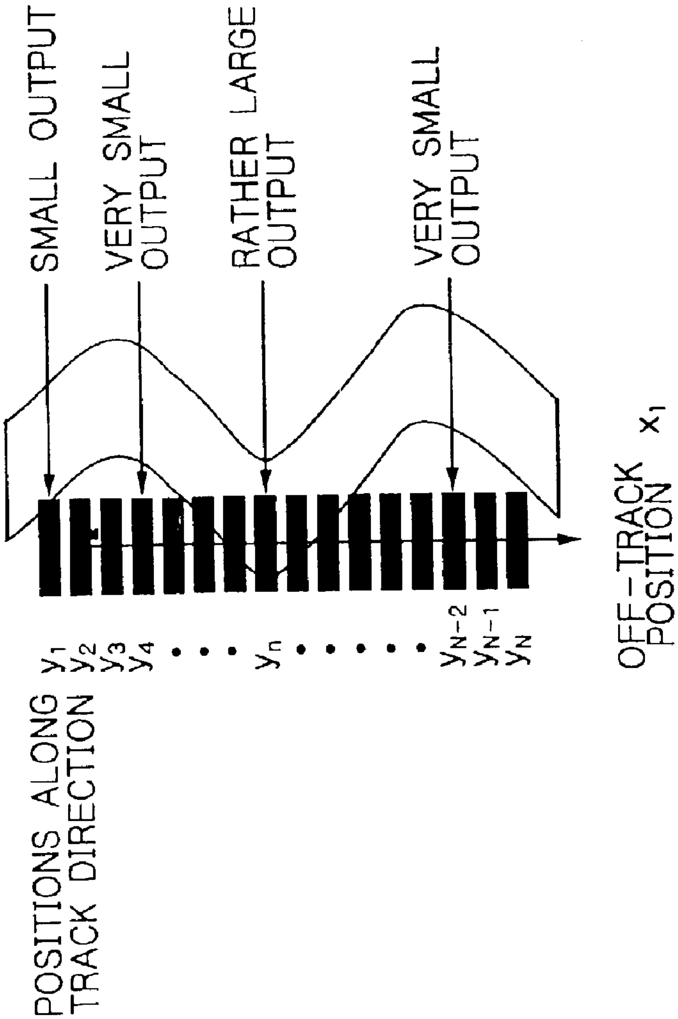
FIGS. 12*a* and 12*b* show views illustrating magnitude of read-out information or output with respect to positions along the track direction at off-track positions.
Figure 12B:
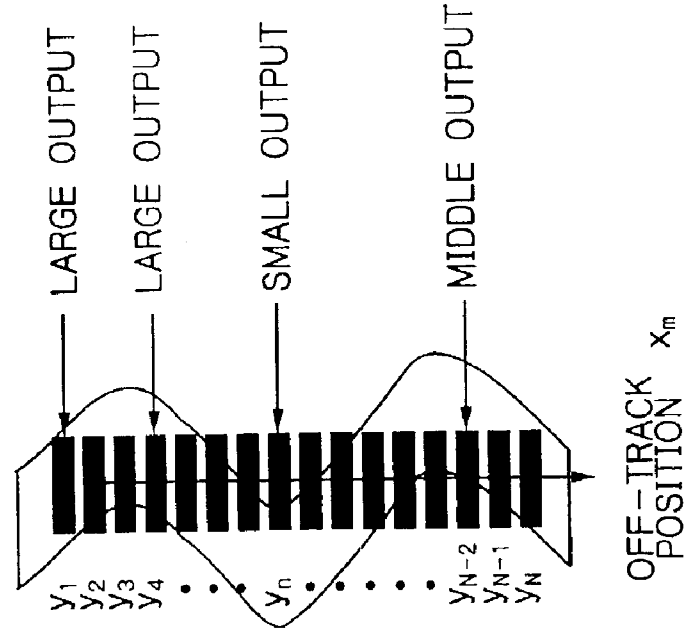
Figure 13:
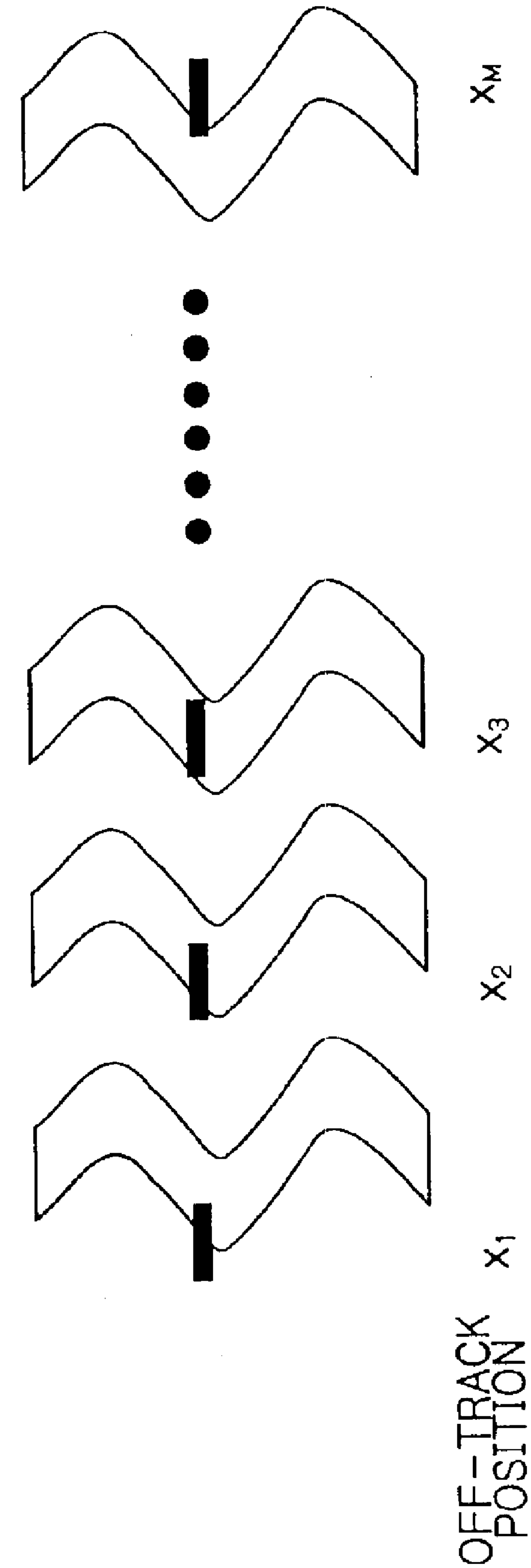
FIG. 13 shows a view illustrating magnitude of read-out information or output with respect to off-track positions at one position along the track direction.
Figure 14:
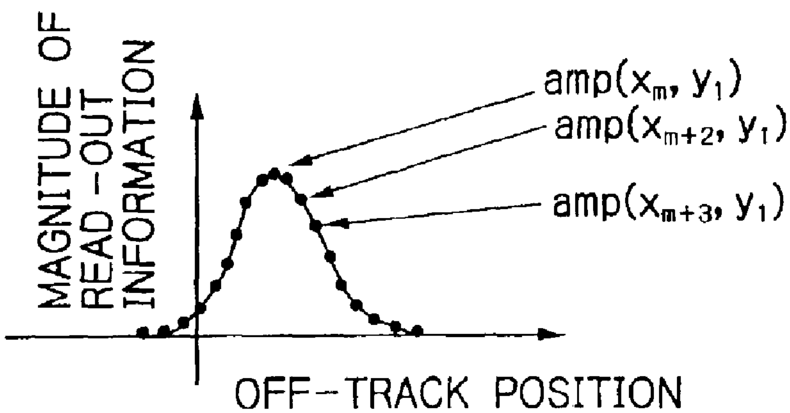
FIG. 14 shows a view illustrating an off-track position where the magnitude of read-out information or output is maximum at one position along the track direction.

In case that one track of information is read out at the off-track position $x_1$ as shown in FIG. 12$a$, an amplitude or value of the read-out information or output is small at the position $y_n$ along the disk-rotating direction or the track direction, very small at the position $y_4$, rather large at the position $y_n$, and very small at the position $y_{N-2}$. In case that one track of information is read out at the off-track position $x_m$ as shown in FIG. 12$b$, an amplitude or value of the read-out information or output is large at the position $y_1$ along the disk-rotating direction or the track direction, also large at the position $y_4$, small at the position $y_n$, and middle at the position $y_{N-2}$. In the memory 32, digital read-out information obtained by performing the above-mentioned read operation at all the off-track positions $x_1, x_2, x_3, \ldots, x_m, \ldots, x_M$ and A/D conversion of the analog read-out information are stored in two-dimensional array. At the position $y_n$ along the disk-rotating direction or the track direction, as shown in FIG. 13, the value of the read-out information or output amp($x_m$, $y_n$) is middle at the off-track position $x_1$, large at the off-track positions $x_2$ and $x_3$, and small at the off-track position $x_M$. Thus, at step S7, an off-track position where the read-out information amp($x_1$, $y_1$), amp($x_2$,$y_1$), . . . , amp($x_m$,$y_1$), . . . , amp($x_M$,$y_1$) stored in the memory 32 becomes the maximum value is determined at the position $y_1$ along the disk-rotating direction. As shown in FIG. 14, in this case, the read-out information amp($x_m$,$y_1$) at the off-track position $x_m$ is the maximum. Then, in the similar manner, off-track positions where the read-out information become maximum are determined in sequence at the positions $y_2, y_3, \ldots, y_n, \ldots, y_N$ along the disk-rotating direction, respectively.

The off-track position D(n) where the read-out information becomes maximum at each position $y_n$ along the disk-rotating direction can be calculated using the following program described in BASIC language.

```
For n=1 to N step 1
    D(n)=0
    Max=-1000
    For m=1 to M step 1
        If amp(m,n)>Max then
            Max=amp(m,n)
            D(n)=x(m)
        End if
    Next m
Next n
```

where x(1), x(2), x(3), . . . , x(M) represent the aforementioned off-track positions $x_1, x_2, x_3, \ldots, x_M$, y(1), y(2), y(3), . . . , y(N) represent the aforementioned off-track positions $y_1, y_2, y_3, \ldots, y_N$, and amp(m, n) represents the aforementioned amp($x_m$,$y_n$).

Figure 15:
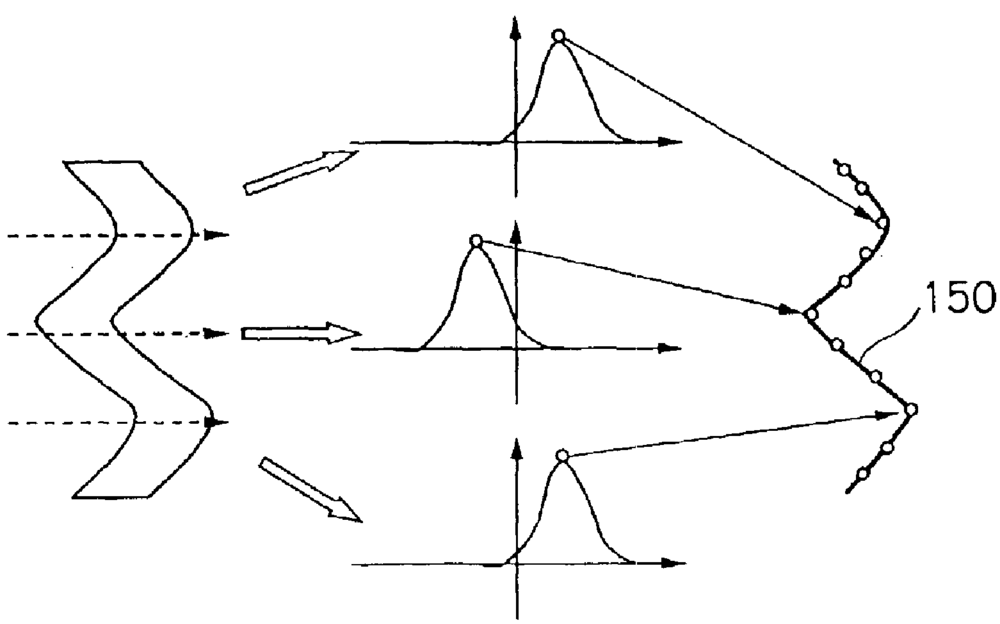
FIG. 15 shows a view illustrating the reason why a center line of the magnetic information track written to the magnetic disk can be obtained by plotting off-track positions where the magnitude of read-out information or outputs are maximum and connecting plotted positions.

Then, as shown in FIG. 15, by plotting these off-track positions where the read-out information become maximum at the positions $y_1, y_2, y_3, \ldots, y_n, \ldots, y_N$ along the disk-rotating direction and by connecting these plotted points, a curve 150 that indicates a center line of the magnetic information track written on the magnetic disk can be obtained. This curve 150 corresponds to displacement of the actuator during write operation. Thus, a response performance of the actuator 11 in response to the applied alternating drive current is determined (step S8).

As aforementioned, since the displacement performance of the actuator is obtained by utilizing inherent functions of the R/W tester, it is not necessary to introduce a new inspection instrument resulting a manufacturing cost of the HGA to prevent from increasing. Also, since the displacement performance test can be executed simultaneously with the normal test of the electromagnetic conversion performance of the HGA using the R/W tester, the number of the inspection processes will not increase although the inspection item increases. Therefore, the displacement performance of the actuator can be easily obtained in a short time. In addition, because of no enlarging of a footprint of the inspection instruments, the manufacturing cost of the HGA can be further prevented from increasing.

Particularly, according to this embodiment, it is possible to obtain an actual waveform as a function of time D(t) of how the actuator 11 responses to the sine wave drive signal applied to the actuator. From this function, actuator characteristics can be obtained by performing unlimited measurement and/or mathematical calculation. Followings are some examples.

Figure 16:
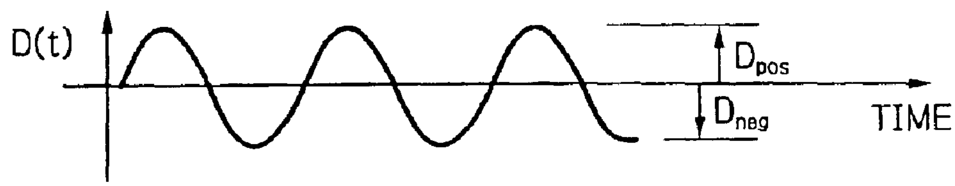
FIG. 16 shows a wave-shape view illustrating advantages of the embodiment of FIG. 4.

(1) As shown in FIG. 16, alternating (AC) stroke characteristics and alternating (AC) stroke asymmetry characteristics of the actuator can be directly measured from the actual waveform. Namely, the AC stroke is given from $D_{pos}+D_{neg}$, and the AC stroke asymmetry is given from $(D_{pos}+D_{neg})/(D_{pos}-D_{neg})\times 100$ (%), where $D_{pos}$ is an averaged positive amplitude and $D_{neg}$ is an averaged negative amplitude. Also, a displacement performance of the actuator with respect to various frequencies and a frequency response performance of the actuator may be obtained by executing the similar measurement with different frequencies of the AC drive signal applied to the actuator.

Figure 17A:
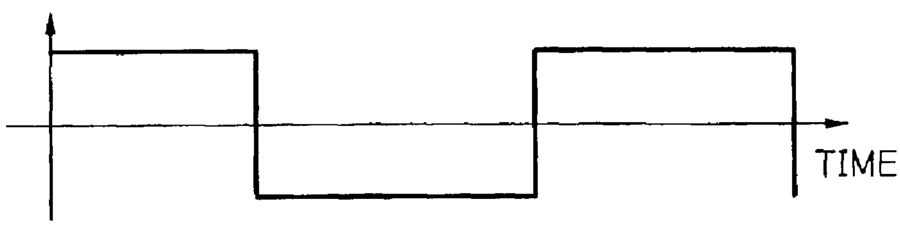
FIGS. 17*a* and 17*b* show wave-shape views illustrating advantages of the embodiment of FIG. 4.
Figure 17B:
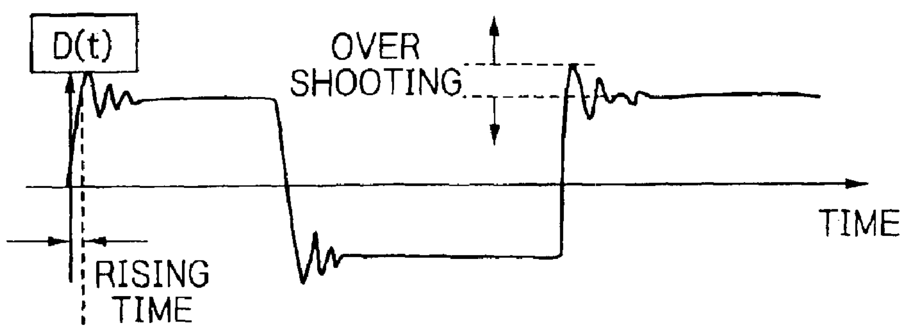

(2) Step response characteristics of the actuator as shown in FIG. 17$b$ can be directly obtained from the waveform by applying a rectangular waveform drive signal as shown in FIG. 17$a$ to the actuator during write operation.

(3) Reliable AC stroke characteristics with no unnecessary noise and no drift of the actuator may be calculated by performing a digital Fourier analysis of D(t).

Figure 18A:
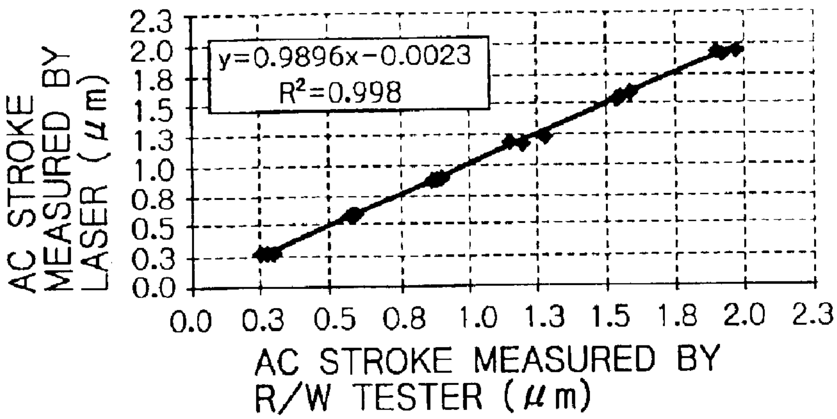
FIGS. 18*a*, 18*b* and 18*c* show graphs illustrating correlations between AC stroke measured by using a R/W tester of the embodiment of FIG. 4 and AC stroke measured by using a laser Doppler vibration meter.
Figure 18B:
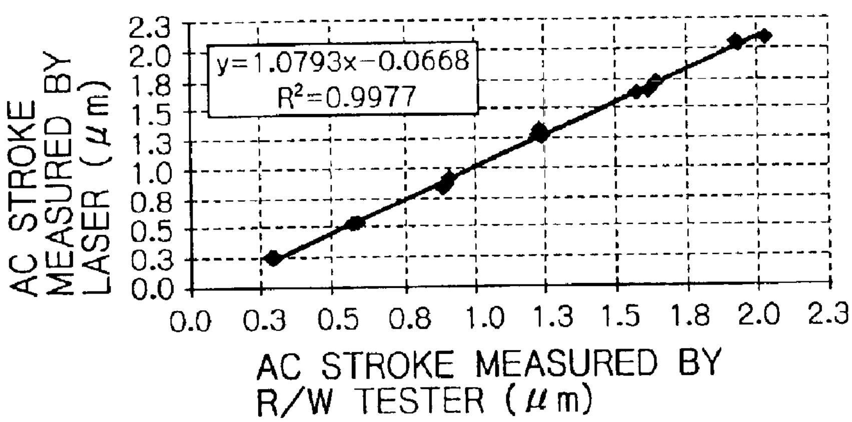
Figure 18C:
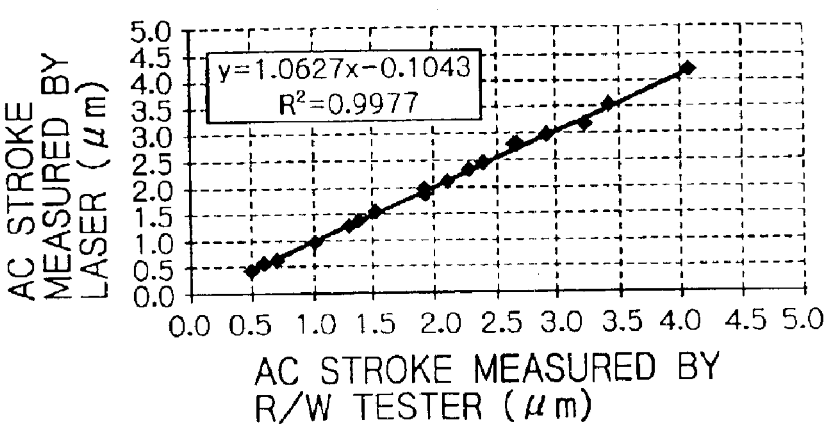

An AC stroke of the actuator was actually measured by using the R/W tester as in this embodiment and by using the laser Doppler vibration meter as in the prior art, and then correlations of these measured results were calculated. FIGS. 18$a$–18$c$ illustrate correlations between averaged AC stroke of three samples of the actuator measured by using the R/W tester and averaged AC stroke of the three samples of the actuator measured by using the laser Doppler vibration meter. Each measurement of the AC stroke was performed by applying a sine wave drive signal with an amplitude varied by 10 V step between 10 V and 60 V to the actuator. The correlations of FIGS. 18$a$, 18$b$ and 18$c$ were measured by applying the sine wave drive signals with different frequencies of 1 kHz, 3 kHz and 10 kHz, respectively. Since there are very good correlation between the R/W tester measurement and the laser Doppler vibration meter measurement, it is understood that correct response displacement and response speed of an actuator with respect to a drive signal can be measured by the method of this embodiment.

Figure 19:
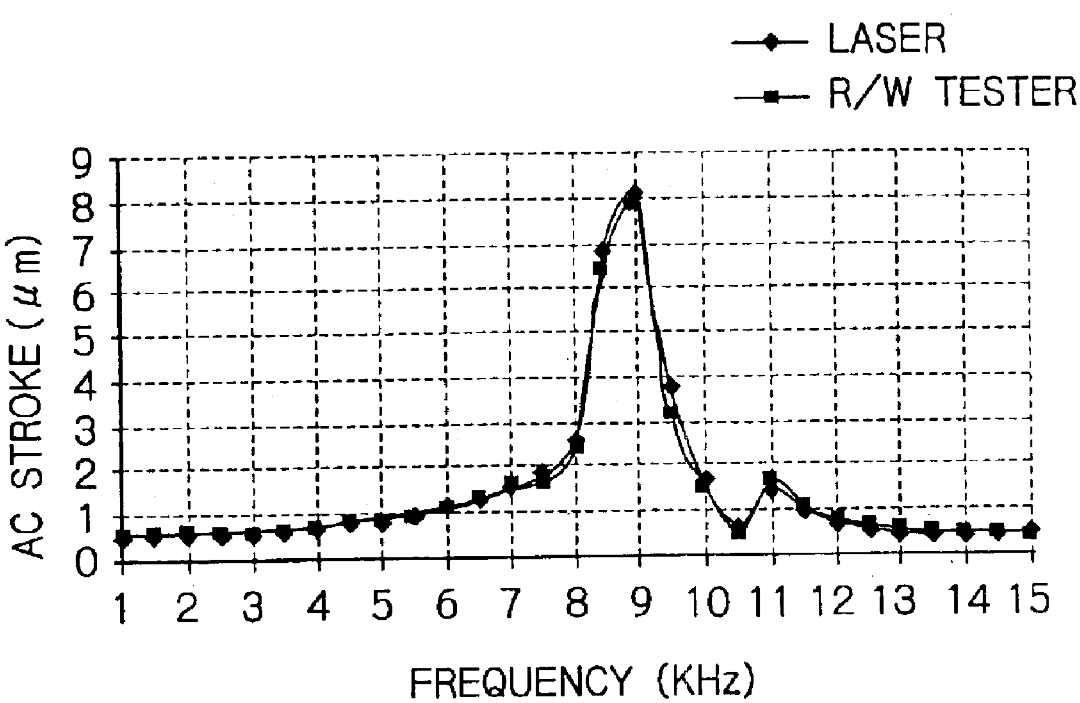
FIG. 19 shows a graph illustrating frequency response characteristics measured by using the R/W tester of the embodiment of FIG. 4 and measured by using the laser Doppler vibration meter.

A frequency response of AC stroke of the actuator was actually measured by using the R/W tester as in this embodiment and by using the laser Doppler vibration meter as in the prior art. FIG. 19 illustrates the measured results. The sine wave drive signal applied to the actuator was AC±20 V and its frequency was varied between 1–15 kHz by 0.5 kHz step. Since the measured results of the R/W tester and the laser Doppler vibration meter substantially coincide with each other, it is understood that correct frequency response characteristics of an actuator with respect to a drive signal can be measured by the method of this embodiment.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising steps of:

writing information from said at least one thin-film magnetic head element onto a magnetic disk while driving said actuator for displacement by applying an alternating drive signal to said actuator to write a track of information having an alternating center line shape;

reading out the information of at least one rotation of said magnetic disk by said at least one thin-film magnetic head element without driving said actuator for displacement;

storing the information read-out from said magnetic disk as a read-out information along a disk-rotating direction;

moving said head gimbal assembly toward an off-track direction by a predetermined distance;

repeatedly executing said reading, storing and moving steps to obtain two-dimensional read-out information along the disk-rotating direction and the off-track direction; and determining, from said two-dimensional read-out information, an off-track position where the read-out information becomes maximum at each position along the disk-rotating direction, the determined off-track positions being recognized as displaced positions of said actuator in response to the applied alternating drive signal.

2. The method as claimed in claim 1, wherein said storing step comprises sampling of the read-out information at a time interval, and storing of the information sampled.

3. The method as claimed in claim 1, wherein said alternating drive signal is a sine wave alternating signal.

4. The method as claimed in claim 1, wherein said alternating drive signal is a rectangular wave alternating signal.

5. The method as claimed in claim 1, wherein said method is repeated by varying a frequency of said alternating drive signal so as to obtain frequency response characteristics of said actuator.

6. A method for testing a performance of a head gimbal assembly including a magnetic head slider with at least one thin-film magnetic head element, a support and an actuator for displacing said magnetic head slider with respect to said support so as to precisely position said at least one thin-film magnetic head element, said method comprising steps of:

writing information from said at least one thin-film magnetic head element onto a magnetic disk while driving said actuator for displacement by applying an alternating drive signal to said actuator wherein a center line of a track of information has an alternating shape;

reading out the information of at least one rotation of said magnetic disk by said at least one thin-film magnetic head element without driving said actuator for displacement;

storing the information read-out from said magnetic disk as a read-out information along a disk-rotating direction;

moving said head gimbal assembly toward an off-track direction by a predetermined distance;

repeatedly executing said reading, storing and moving steps to obtain two-dimensional read-out information along the disk-rotating direction and the off-track direction; and determining, from said two-dimensional read-out information, an off-track position where the read-out information becomes maximum at each position along the disk-rotating direction, the determined off-track positions being recognized as displaced positions of said actuator in response to the applied alternating drive signal.

7. The method as claimed in claim 6, wherein said storing step comprises sampling of the read-out information at a time interval, and storing of the information sampled.

8. The method, as claimed in claim 6, wherein said alternating drive signal is a sine wave alternating signal.

9. The method as claimed in claim 6, wherein said alternating drive signal is a rectangular wave alternating signal.

10. The method as claimed in claim 6, wherein said method is repeated by varying a frequency of said alternating drive signal so as to obtain frequency response characteristics of said actuator.

* * * * *

UNITED STATES PATENT AND TRADEMARK OFFICE

CERTIFICATE OF CORRECTION

PATENT NO. : 6,989,949 B2 
DATED : January 24, 2006
INVENTOR(S) : Tsz Lok Cheng et al.

It is certified that error appears in the above-identified patent and that said Letters Patent is hereby corrected as shown below:

Title page,
Item [54], change "GIMGAL" to -- GIMBAL --.

Signed and Sealed this

Fourth Day of April, 2006

JON W. DUDAS
*Director of the United States Patent and Trademark Office*